United States Patent Office 2,956,960
Patented Oct. 18, 1960

2,956,960

COMPOSITIONS COMPRISING A STYRENE POLYMER, A HYDROCARBON AND AN AMINOACID AND METHOD OF FOAMING SAME

Speros Peter Nemphos, Springfield, Mass., assignor to Monsanto Chemical Company, St. Louis, Mo., a corporation of Delaware No Drawing. Filed Feb. 4, 1958, Ser. No. 713,106

8 Claims. (Cl. 260—2.5)

The present invention relates to a process for extruding foamable styrene polymer compositions and to the particular foamable styrene polymer compositions to be employed therein.

Styrene polymer foams constitute a valuable class of materials which are finding increasingly wide application in the fabrication of numerous industrial and consumer articles. A widely used method for fabricating such styrene polymer foams comprises extruding particulate foamable styrene compositions through screw-type extruders. When styrene polymer foams are prepared by such extrusion processes it is difficult to obtain foams in which the cell sizes are uniform and which cells have an average diameter of less than about 0.05 inch. Styrene polymer foams containing cells of this size are brittle and the fragile nature of the extruded products limits their acceptance in the art. While certain additives may be incorporated in the particulate foamable styrene polymer compositions to reduce the cell size of the extruded foams, such additives are relatively inefficient and/or seriously reduce the rate at which such compositions can be extruded.

It is an object of this invention to provide an improved process for extruding particulate foamable styrene polymer compositions.

Another object of this invention is to provide an improved process for extruding particulate foamable styrene polymer compositions in which the cell sizes in the extruded foams are substantially uniform and less than about 0.02 inch in diameter.

A further object of this invention is to provide particulate foamable styrene polymer compositions which, when extruded, provide foamed articles in which the cell sizes are substantially uniform and less than about 0.02 inch in diameter.

Other objects and advantages of the invention will become apparent from the following detailed description thereof.

It has been discovered that when a small quantity of a finely divided aminoacid is admixed with a particulate foamable styrene polymer composition, the resulting composition can be extruded by conventional techniques to prepare resilient styrene polymer foams in which the cell sizes are substantially uniform and less than about 0.02 inch in diameter. The admixed aminoacid-particulate foamable styrene polymer compositions can be extruded at very satisfactory rates and do not require modification of presently employed processes.

The following examples are set forth to illustrate more clearly the principle and practice of this invention to those skilled in the art. Unless otherwise specified, where quantities are mentioned, they are parts by weight.

Example I

Ninety-eight and one-half parts of foamable polystyrene particles approximately 1 mm. in diameter and containing 7 weight percent pentane as a foaming agent are homogeneously blended with 1.5 parts of alpha-alanine (alpha-aminopropionic acid) that is ground to such a size that it will all pass through a 200-mesh screen. The resulting composition is extruded into a foamed sheet through a conventional single screw extruder and sheet die at an extrusion temperature of about 315° F. The resulting foam has a density of about 4 lbs. per cubic foot and a fine uniform cell structure with substantially all of the cells having a diameter in the range of 0.005–0.01 inch. The foamed sheet is strong and resilient and can be scored and folded through an angle of 180° without fracturing.

In contrast to these results, when the same foamable polystyrene particles are extruded under identical conditions in the absence of the alpha-alanine, a brittle foam is obtained. The cell sizes of the foam are grossly irregular and the diameter of nearly all the cells exceeds 0.05 inch. This foam fractures when it is scored and folded through an angle of 180°.

Example II

Example I is repeated except that 99.5 parts of the foamable polystyrene particles are admixed with 0.5 part of the alpha-alanine. The foamed sheet obtained when this composition is extruded has slightly larger cell sizes than the foam obtained in Example I with the maximum cell size being about 0.015 mm. The sheet can be scored and folded through 180° without fracturing.

Example III

Example I is repeated except that the alpha-alanine is replaced with an equivalent quantity of, respectively, 2-amino-3-methylbutanoic acid, 1-aminocyclohexane carboxylic acid, phenyl glycine and 2,4-dimethyl-2-aminovaleric acid. In each case comparable results are obtained when the compositions are extruded.

Example IV

Example I is repeated except that the alpha-alanine is replaced with an equivalent quantity of 2-methyl-2-aminobutyric acid. In this case, an even finer cell size foam is obtained on extrusion with substantially all of the cells having a diameter in the range of 0.003–0.008 in.

The extrudable compositions of this invention comprise an intimate physical admixture of (1) a styrene polymer having an aliphatic hydrocarbon foaming agent incorporated therein and (2) a finely divided aminoacid.

The aminoacids employed in the invention conform to the formula:

$$H_2N-R-COOH$$

where R is an aliphatic radical. The preferred aminoacids are of the alpha type in which the amino group is attached to a carbon atom adjacent to the carboxyl group. Optionally, the beta, gamma or delta forms of the aminoacids may be employed. Typical examples of such aminoacids include alpha- and beta-alanine, aline (alphaaminoisovaleric acid), norvaline (alpha-aminovaleric acid), leucine (alpha-aminoisocaproic acid), norleucine (alpha-aminocaproic acid), isoleucine (alpha-amino-beta-methylethylpropionic acid), isovaline (alpha-amino-alpha-methylbutyric acid), phenylalanine (alpha-amino-beta-phenylpropionic acid), tyrosine (alpha-amino-beta-parahydroxyphenylpropionic acid), serine (alpha - amino - beta - hydroxy-propionic acid), alpha-amino-beta-hydroxybutyric acid, cysteine (alpha-amino-beta-thiopropionic acid), methionine (alpha-amino-gamma-methylthiobutyric acid), thyroxine, aspartic acid (alpha-aminosuccinic acid), glutamic acid (alpha-aminoglutaric acid), arginine (alpha-amino-delta-guanidine valeric acid), lysine (alpha, epsilon-diaminocaproic acid), ornithine (alpha, delta-diaminovaleric acid), asparagine (alpha-aminosuccinamic acid), citrulline (alpha-amino-delta-ureylvaleric acid), histidine (alpha-amino-beta-imidazolepropionic acid), tryptophane (alpha-amino-beta-indole-propionic acid), proline (alpha-pyrrolidine carboxylic acid) and hydrooxyproline (hydroxyl-alpha-pyrrolidine carboxylic acid).

The majority of the aminoacids as obtained commercially contain water of hydration in their crystalline form. There is no necessity for removing this water and indeed it appears that the efficiency of the aminoacids in reducing the pore size of the extruded styrene polymer foams is reduced when they are dried to a rigorously anhydrous state.

The aminoacids should be of such a size so that substantially all of the acid will pass through a 100-mesh screen or especially through a 200-mesh screen. The aminoacids are employed in only small amounts, usually in the range of about 0.1–2.0 and preferably 0.5–1.5 weight percent of the total composition.

The styrene polymers included in the compositions of this invention are homopolymers of styrene and interpolymers of styrene containing a predominant proportion of styrene, i.e., greater than 50 weight percent and preferably greater than 75 weight percent styrene. Examples of monomers that may be interpolymerized with the styrene included the conjugated 1,3-dienes, e.g., butadiene, isoprene, etc., alpha, beta unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. If desired, blends of the styrene polymer with other polymers may be employed, e.g., blends of the styrene polymer with rubbery diene polymers, or the analogous compositions obtained by dissolving a rubbery diene polymer in the styrene monomer and subsequently polymerizing the mixture. In any of the above type resins, all or a portion of the styrene may be replaced with its closely related homologues such as alpha-methylstyrene, o-, m-, and p-methylstyrenes, o-, m- and p-ethylstyrenes, 2,4-dimethylstyrene, etc. In general, the styrene polymers employed should have a molecular weight in the range of about 40,000–80,000 (as determined by the Staudinger method).

The foaming agent included in the compositions of the invention are aliphatic hydrocarbons boiling within the range of about 10° C. to about 80° C., e.g., pentane, hexane, heptane, cyclopentane, cyclopentadiene and petroleum ethers boiling within the indicated temperature range. If desired, mixtures of 2 or more such foaming agents may be employed.

The extrusion process provided by the present invention is conventional except for the composition employed therein. For example, the extrusion operation may be carried out in continuous screw extruders at temperatures ranging from about 250° F. to about 400° F., depending upon the softening temperature of the styrene polymer employed. The most uniform material is obtained by extruding at temperatures of 300–325° F. The material may be extruded through dies of any desired configuration into open or closed molds or into the open air. The pressure of the die should be greater than about 150 p.s.i. to prevent foaming within the die. The extrusion rates obtainable under any given set of extrusion conditions are fully equivalent to those obtained with corresponding foamable styrene polymer compositions which do not contain an aminoacid.

The above descriptions and particularly the examples are set forth by way of illustration only. Many other variations and modifications thereof will be apparent to those skilled in the art and can be made without departing from the spirit and scope of the invention herein described.

What is claimed is:

1. In a process for preparing a foamed styrene polymer by extruding a particulate foamable styrene polymer composition having incorporated therein, as a foaming agent, an aliphatic hydrocarbon having a boiling point of about 10–80° C.; the improvement which comprises admixing with said particulate foamable styrene polymer composition a finely divided aminoacid of the formula:

$$H_2N\text{---}R\text{---}COOH$$

where R is an aliphatic radical, said aminoacid being sufficiently fine to pass through a 100-mesh screen and being present in the amount of 0.1–2.0 weight percent of the total composition; the styrene polymer included in the foamable styrene polymer composition being selected from the group consisting of (a) a homopolymer of a monomer selected from the group consisting of styrene, o-, m-, and p-methylstyrenes, o-, m-, and p-ethylstyrenes and 2,4-dimethylstyrene, (b) an interpolymer consisting solely of at least two monomers selected from the group consisting of styrene, alpha-methylstyrene, o-, m-, and p-methylstyrenes, o-, m-, and p-ethylstyrenes and 2,4-dimethylstyrene, and (c) an interpolymer of at least 50 weight percent of a monomer selected from the group consisting of styrene, alpha-methylstyrene, o-, m-, and p-methylstyrenes, o-, m-, and p-ethylstyrenes, 2,4-dimethylstyrene and mixtures thereof with up to 50 weight percent of a monomer selected from the group consisting of butadiene, isoprene, acrylic acid, alkyl esters of acrylic acid in which the alkyl group contains 1–8 carbon atoms, alkyl esters of methacrylic acid in which the alkyl group contains 1–8 carbon atoms, acrylamide, methacrylamide, acrylonitrile and methacrylonitrile.

2. The process of claim 1 in which the aminoacid is selected from the group consisting of alphaalanine, 2-methyl-2-aminobutyric acid, 2-amino-3-methylbutanoic acid, 1-aminocyclohexane carboxylic acid, phenyl glycine and 2,4-dimethyl-2-aminovaleric acid.

3. The process of claim 2 wherein the aminoacid is alpha-alanine.

4. The process of claim 2 wherein the aminoacid is 2-methyl-2-aminobutyric acid.

5. A foamable composition comprising a physical admixture of (1) a particulate styrene polymer having incorporated therein, as a foaming agent, an aliphatic hydrocarbon having a boiling point of 10–80° C., and (2) a finely divided aminoacid having the formula:

$$H_2N\text{---}R\text{---}COOH$$

where R is an aliphatic radical, said aminoacid being sufficiently fine to pass through a 100-mesh screen and being present in the amount of 0.1–2.0 weight percent of the total composition; said styrene polymer being selected from the group consisting of (a) a homopolymer of a monomer selected from the group consisting of styrene, o-, m-, and p-methylstyrenes, o-, m-, and p-ethylstyrenes, and 2,4-dimethylstyrene, (b) an interpolymer consisting solely of at least two monomers selected from the group consisting of styrene, alpha-methylstyrene, o-, m-, and p-methylstyrenes, o-, m-, and p-ethylstyrenes and 2,4-dimethylstyrene, and (c) an interpolymer of at least 50 weight percent of a monomer selected from the group consisting of styrene, alpha-methylstyrene, o-, m-, and p-methylstyrenes, o-, m-, and p-ethylstyrenes, 2,4-dimethylstyrene and mixtures thereof with up to 50 weight percent of a monomer selected from the group consisting of butadiene, isoprene, acrylic acid, alkyl esters of acrylic acid in which the alkyl group contains 1–8 carbon atoms, alkyl esters of methacrylic acid in which the alkyl group contains 1–8 carbon atoms, acrylamide, methacrylamide, acrylonitrile and methacrylonitrile.

6. The compositions of claim 5 in which the aminoacid is selected from the group consisting of alpha-alanine, 2-methyl-2-aminobutyric acid, 2-amino-3-methylbutanoic acid, 1-aminocyclohexane carboxylic acid, phenyl glycine and 2,4-dimethyl-2-aminovaleric acid.

7. The compositions of claim 6 in which the aminoacid is alpha-alanine.

8. The compositions of claim 6 in which the aminoacid is 2-methyl-2-aminobutyric acid.

No references cited.

UNITED STATES PATENT OFFICE
CERTIFICATION OF CORRECTION

October 18, 1960

Patent No. 2,956,960

Speros Peter Nemphos

It is hereby certified that error appears in the above numbered patent requiring correction and that the said Letters Patent should read as corrected below.

Column 1, line 22, after "styrene" insert -- polymer --; column 2, line 54, for "alphaaminoisovaleric" read -- alpha-aminoisovaleric --; column 4, line 29, for "alphaalanine" read -- alpha-alanine --.

Signed and sealed this 2nd day of May 1961.

(SEAL)
Attest:

ERNEST W. SWIDER
Attesting Officer

DAVID L. LADD
Commissioner of Patents